(12) United States Patent
Inoshita

(10) Patent No.: US 11,140,363 B2
(45) Date of Patent: Oct. 5, 2021

(54) INFORMATION PROCESSING APPARATUS, CONTROL METHOD, AND PROGRAM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/466,345

(22) PCT Filed: Dec. 5, 2016

(86) PCT No.: PCT/JP2016/086039
§ 371 (c)(1),
(2) Date: Jun. 4, 2019

(87) PCT Pub. No.: WO2018/104998
PCT Pub. Date: Jun. 14, 2018

(65) Prior Publication Data
US 2020/0084417 A1    Mar. 12, 2020

(51) Int. Cl.
*H04N 7/18* (2006.01)
*G06K 9/00* (2006.01)
(Continued)

(52) U.S. Cl.
CPC ......... *H04N 7/181* (2013.01); *G06K 9/00771* (2013.01); *G08B 13/196* (2013.01); *G08B 25/14* (2013.01); *G06T 2207/30232* (2013.01)

(58) Field of Classification Search
CPC ............ G08B 13/196; G08B 13/19613; G08B 25/14; G06Q 10/087; G06Q 20/18;
(Continued)

(56) References Cited

U.S. PATENT DOCUMENTS 8,325,036 B1 * 12/2012 Fuhr ................ G08B 13/19613
340/540
8,457,354 B1 * 6/2013 Kolar ................ G06K 9/00677
348/143
(Continued)

FOREIGN PATENT DOCUMENTS

JP       5-81552 A     4/1993
JP       7-110889 A    4/1995
(Continued)

OTHER PUBLICATIONS

International Search Report for PCT/JP2016/086039 dated Feb. 21, 2017 [PCT/ISA/210].

*Primary Examiner* — Masum Billah
(74) *Attorney, Agent, or Firm* — Sughrue Mion, PLLC

(57) ABSTRACT

To accurately detect theft of a product. An information processing apparatus (2000) acquires a reference image (13) in which a product exhibition location is imaged. In addition, the information processing apparatus (2000) acquires a comparison image (14), in which a product shelf is imaged at a time after the reference image (13) is imaged. Furthermore, the information processing apparatus (2000) computes the quantity of reduction in products inside a surveillance area (15) included in both the reference image (13) and the comparison image (14). Furthermore, the information processing apparatus (2000) outputs the warning in a case where the computed quantity of reduction is equal to or larger than the reference value.

17 Claims, 16 Drawing Sheets

(51) Int. Cl.
*G08B 13/196* (2006.01)
*G08B 25/14* (2006.01)

(58) Field of Classification Search
CPC .. G06Q 20/203; G06Q 30/02; G06Q 30/0212;
G06Q 30/0283; G06K 9/00771; G06K
2209/17; G06T 2207/30232; G06T
2207/30196; G06T 7/20; H04N 7/181
USPC ........................................................ 348/143
See application file for complete search history.

(56) References Cited

U.S. PATENT DOCUMENTS

2006/0282323 A1\* 12/2006 Walker ................... G07F 5/18
705/14.14
2015/0019391 A1\* 1/2015 Kumar ................ G06Q 10/087
705/28

FOREIGN PATENT DOCUMENTS

| JP | 2012-174154 A | 9/2012 | |
| JP | 2012174154 A \* | 9/2012 | |
| WO | WO-2008134381 A1 \* | 11/2008 | ............. G07G 1/009 |

\* cited by examiner

IMAGING DIRECTION

IMAGING DIRECTION

FIG. 10

| SURVEILLANCE AREA ID | MEASURING RULE | VALUE |
|---|---|---|
| 001 | PRICE | 0.01 [ YEN/PIXEL ] |
| 001 | NUMBER | 0.05 [NUMBER/PIXEL] |
| 002 | PRICE | 0.02 [ YEN/PIXEL ] |
| 002 | NUMBER | 0.03 [NUMBER/PIXEL] |
| ... | ... | ... |

INFORMATION PROCESSING APPARATUS, CONTROL METHOD, AND PROGRAM

CROSS REFERENCE TO RELATED APPLICATIONS

This application is a National Stage of International Application No. PCT/JP2016/086039 filed Dec. 5, 2016.

TECHNICAL FIELD

The present invention relates to an information processing apparatus, a control method, and a program.

BACKGROUND ART

There is a case where an exhibited product is thieved in a store. Here, in order to prevent theft of the product, a security guard is on guard while walking around in the store or surveils a video of a surveillance camera.

However, a lot of labors are required to manually perform surveillance. In addition, it is difficult to keep surveilling manually all places where products are exhibited, and there is a possibility that leakage of surveillance occurs.

Here, a system is developed which manages a product exhibition situation using an information processing technology. For example, Patent Document 1 discloses a system which detects that a product disappears using a marker provided on a product shelf. Specifically, the marker is provided in advance in a location, which may be seen in a case where the product disappears, with respect to the product shelf. Furthermore, the system analyses images in which the product shelf is captured, and detects the disappearance of a product when the marker is detected.

In addition, Patent Document 2 discloses a system which outputs a product replenishment command in a case where a dimension of a base part of an exhibition shelf becomes larger by a predetermined amount or more compared to a store opening time in the image in which the exhibition shelf for products is imaged.

RELATED DOCUMENT

Patent Document

[Patent Document 1] Japanese Patent Application Publication No. 2012-174154
[Patent Document 2] Japanese Patent Application Publication No. H05-81552

SUMMARY OF THE INVENTION

Technical Problem

The system disclosed in Patent Document 1 and Patent Document 2 detects that a residual quantity of products becomes smaller in order to perform product replenishment or the like. On the other hand, in a case where a part of the exhibited products is thieved, there is a possibility that a large quantity of products remains on the product shelf. Thus, in a case where it is attempted to detect the theft of the products using the system disclosed in Patent Document 1 or Patent Document 2, there is a high probability that it is not possible to accurately detect occurrence of the theft.

The present invention is made in view of the above problems. An object of the present invention is to provide a technology for accurately detecting the theft of the product.

Solution to Problem

An information processing apparatus according to the present invention includes: (1) a computation unit that computes the quantity of reduction in products inside a surveillance area, the surveillance area being included in both a first captured image and a second captured image, the first captured image including an exhibition location where the products are exhibited, the second captured image including the exhibition location after the first captured image is imaged; and (2) a warning unit that outputs warning in a case where the computed quantity of reduction is equal to or larger than a reference value.

A control method according to the present invention is executed by a computer.

The control method includes (1) a computation step of computing the quantity of reduction in products inside a surveillance area, the surveillance area being included in both a first captured image and a second captured image, the first captured image including an exhibition location where the products are exhibited, the second captured image including the exhibition location after the first captured image is imaged; and (2) a warning step of outputting warning in a case where the computed quantity of reduction is equal to or larger than a reference value.

A program according to the present invention causes the computer to execute the respective steps included in the control method according to the present invention.

Advantageous Effects of Invention

According to the present invention, there is provided a technology which accurately detects theft of a product.

BRIEF DESCRIPTION OF THE DRAWINGS

The above-described object, other objects, features, and advantages will be further clear through preferable embodiments which will be described below and accompanying drawings below.

FIG. 10 is a diagram illustrating the quantity of products for each unit dimension of the surveillance area using various measuring rules.

DESCRIPTION OF EMBODIMENTS

Hereinafter, embodiments of the present invention will be described with reference to the accompanying drawings. Also, in all drawings, the same symbols are attached to the same components, and description is appropriately omitted. In addition, unless particular description is performed, each block in each block diagram represents a configuration in function units instead of a configuration in hardware units.

First Embodiment

<Concept of Operation of Information Processing Apparatus 2000>

Figure 1:
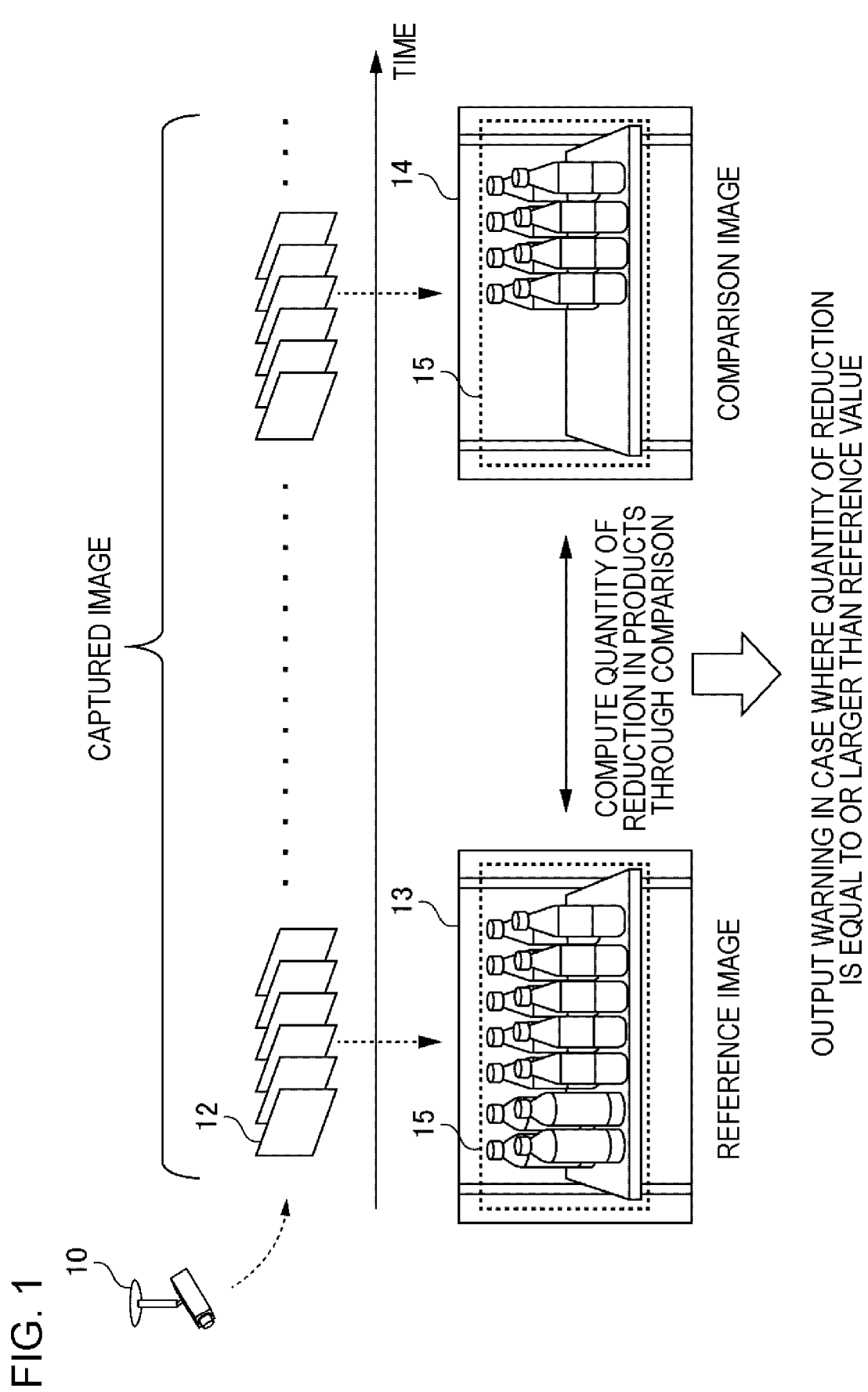
FIG. 1 is a diagram conceptually illustrating an operation of an information processing apparatus according to a first embodiment.

FIG. 1 is a diagram conceptually illustrating an operation of an information processing apparatus 2000 according to a first embodiment. Note that, FIG. 1 is a diagram for illustration aiming at easy understanding of the operation of the information processing apparatus 2000, and the operation of the information processing apparatus 2000 is not limited to FIG. 1 at all.

A camera 10 repeatedly images an exhibition location (for example, a product shelf) where products are exhibited, and generates a plurality of captured images 12. For example, the plurality of captured images 12, which are generated, correspond to a frame group included in video data.

The information processing apparatus 2000 acquires a reference image 13 (first captured image) and a comparison image 14 (second captured image) from the plurality of captured images 12. The comparison image 14 is a captured image which is generated at a time after when the reference image 13 is generated.

A surveillance area 15 is included in the reference image 13 and the comparison image 14. The surveillance area 15 is an area which is included in the captured image 12 and includes a location to be surveilled (hereinafter, a surveillance location). An area to be surveilled includes a product to be surveilled. The surveillance area 15 of the reference image 13 and the surveillance area 15 of the comparison image 14 represent the same surveillance location.

The information processing apparatus 2000 computes the quantity of reduction in products in the surveillance area 15 by analyzing the surveillance area 15 of the reference image 13 and the surveillance area 15 of the comparison image 14. The number of products included in the surveillance area 15 of the reference image 13 is smaller than the number of products included in the surveillance area 15 of the comparison image 14 by 6. Thus, for example, the quantity of reduction in products is 6 in the case of FIG. 1. Note that, as will be described later, a rule of measuring the quantity of reduction in products is not limited to using the number.

In a case where the quantity of reduction in products is equal to or larger than a reference value, the information processing apparatus 2000 outputs warning. For example, in the case of FIG. 1, it is assumed that the reference value is 5. In this case, the quantity of reduction in products is equal to or larger than the reference value. Accordingly, the information processing apparatus 2000 outputs the warning.

<Outline of Configuration of Information Processing Apparatus 2000>

Figure 2:
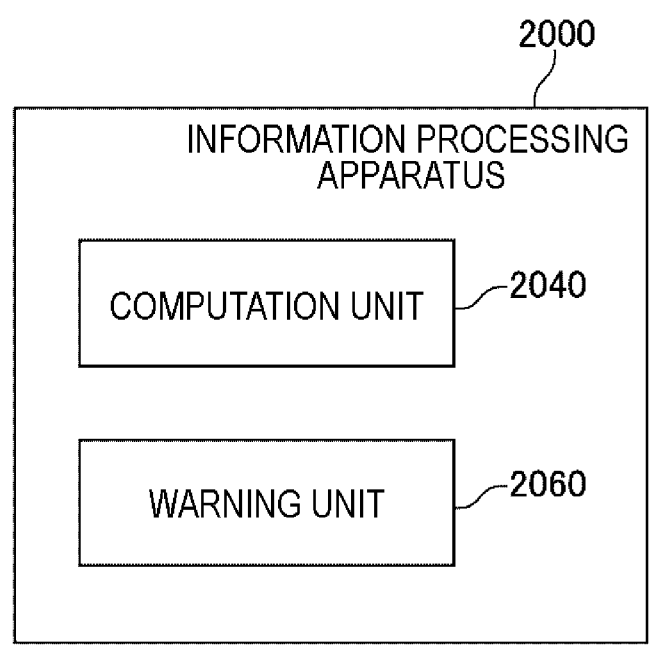
FIG. 2 is a diagram illustrating the information processing apparatus according to the first embodiment.

FIG. 2 is a diagram illustrating the information processing apparatus 2000 according to the first embodiment. The information processing apparatus 2000 includes a computation unit 2040 and a warning unit 2060. The computation unit 2040 acquires the reference image 13 in which a product exhibition location is imaged. In addition, the computation unit 2040 acquires the comparison image 14 in which the product shelf is imaged at a time after the reference image 13 is imaged. Furthermore, the computation unit 2040 computes the quantity of reduction in products in the surveillance area 15 which is included in both the reference image 13 and the comparison image 14. The warning unit 2060 outputs the warning in a case where the computed quantity of reduction is equal to or larger than the reference value.

Advantageous Effects

In the information processing apparatus 2000 according to the embodiment, the reference image 13 is compared with the comparison image 14, and the warning is output in a case where the quantity of reduction in products is equal to or larger than the reference value. In this manner, in a case where a product is thieved, it is possible to cause the warning to be output. Accordingly, it is possible to accurately detect theft of the product.

Hereinafter, the embodiment will be described in further detail.

Example of Hardware Configuration of Information Processing Apparatus 2000

Respective functional configuration units of the information processing apparatus 2000 may be realized by hardware (for example, a hard-wired electronic circuit or the like) which realizes the respective functional configuration units, or may be realized through a combination (for example, a combination of an electronic circuit and a program, which controls the electronic circuit, or the like) of hardware and software. Hereinafter, a case where the respective functional configuration units of the information processing apparatus 2000 are realized through the combination of the hardware and the software will be further described.

Figure 3:
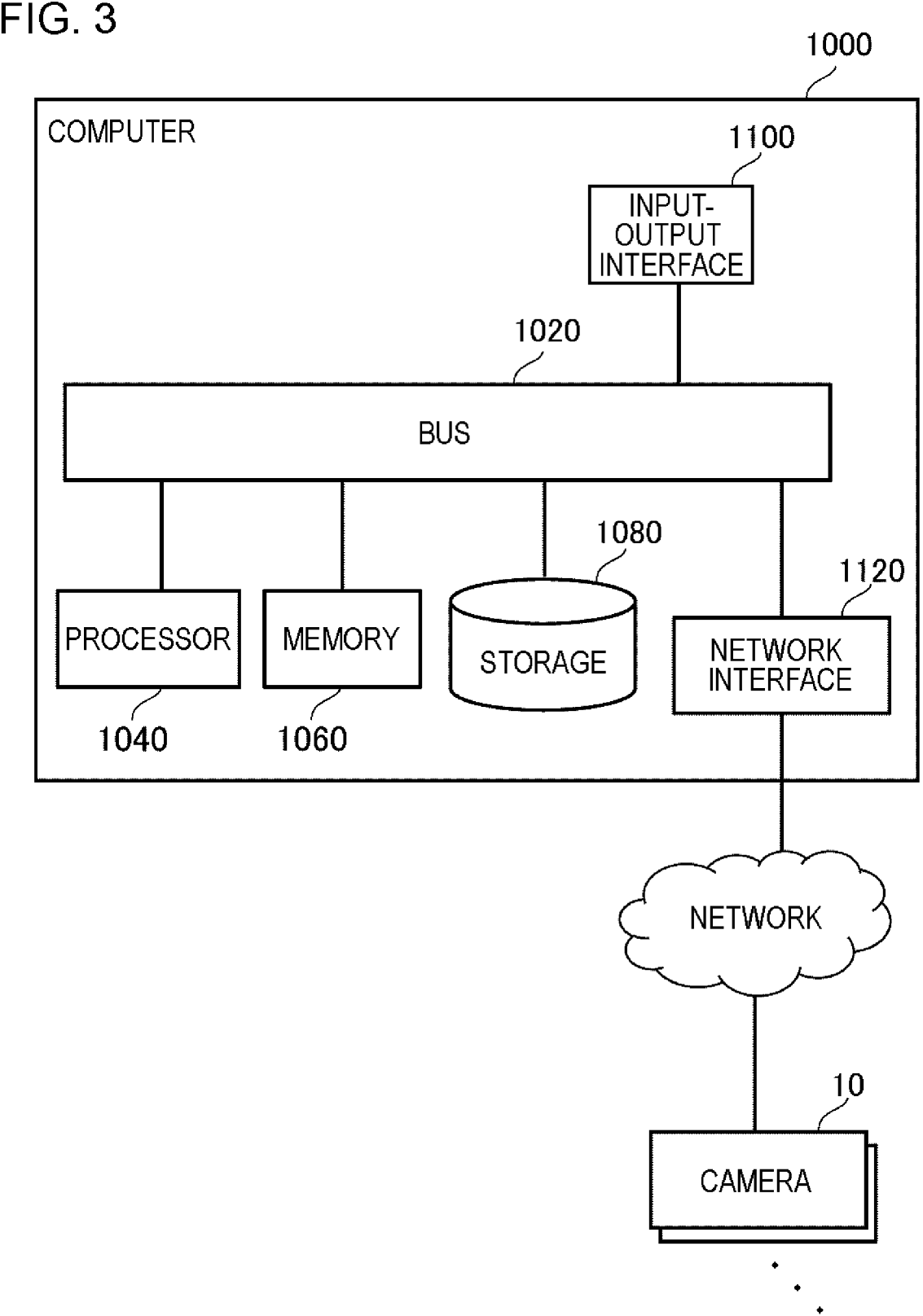
FIG. 3 is a diagram illustrating a computer which is used to realize the information processing apparatus.

FIG. 3 is a diagram illustrating a computer 1000 which is used to realize the information processing apparatus 2000. The computer 1000 is an optional computer. For example, the computer 1000 includes a Personal Computer (PC), a server machine, a tablet terminal, a smartphone, or the like. In another example, the computer 1000 may be the camera 10 which generates the captured images 12. The computer 1000 may be a dedicated computer, which is designed to realize the information processing apparatus 2000, or a general-purpose computer.

The computer 1000 includes a bus 1020, a processor 1040, a memory 1060, a storage device 1080, an input-output interface 1100, and a network interface 1120. The bus 1020 is a data transmission line which is used for the processor 1040, the memory 1060, the storage device 1080, the input-output interface 1100, and the network interface 1120 to transmit and receive data to and from each other. However, a method for connecting the processor 1040 and the like to each other is not limited to bus connection. The processor 1040 is a processor such as a Central Processing Unit (CPU) or a Graphics Processing Unit (GPU). The memory 1060 is a main memory unit which is realized using a Random Access Memory (RAM) or the like. The storage device 1080 is a secondary storage unit which is realized using a hard disk, a Solid State Drive (SSD), a memory card, a Read Only Memory (ROM), or the like. However, the storage device 1080 may include hardware which is the same as hardware, such as the RAM, included in the main memory unit.

The input-output interface 1100 is an interface which is used to connect the computer 1000 to an input-output device. The network interface 1120 is an interface which is used to connect the computer 1000 to a communication network. The communication network is, for example, a Local Area Network (LAN) or a Wide Area Network (WAN). A method for connecting to the communication network by the network interface 1120 may be wireless connection or wired connection.

For example, the computer 1000 is communicably connected to the camera 10 through the network. However, a method for communicably connecting the computer 1000 to the camera 10 is not limited to connection through the network. In addition, the computer 1000 may not be communicably connected to the camera 10.

The storage device 1080 stores program modules which are used to realize the respective functional configuration units (the computation unit 2040 and the warning unit 2060) of the information processing apparatus 2000. The processor 1040 realizes functions corresponding to the respective program modules by reading and executing the respective program modules in the memory 1060.

<Camera 10>

The camera 10 is an arbitrary camera which is capable of generating the plurality of captured images 12 by repeatedly performing imaging. The camera 10 may be a video camera which generates the video data or may be a still camera which generates still image data. Note that, in a former case, the captured images 12 are frames included in the video data.

As described above, the computer 1000, which realizes the information processing apparatus 2000, may be the camera 10. In this case, the camera 10 analyzes the captured images 12 which are generated by the camera 10, and outputs the warning in a case where the quantity of reduction in products is equal to or larger than the reference value. It is possible to use, for example, so-called intelligent camera, network camera, or Internet Protocol (IP) camera, as the camera 10 which includes the above-described function.

<Flow of Process>

Figure 4:
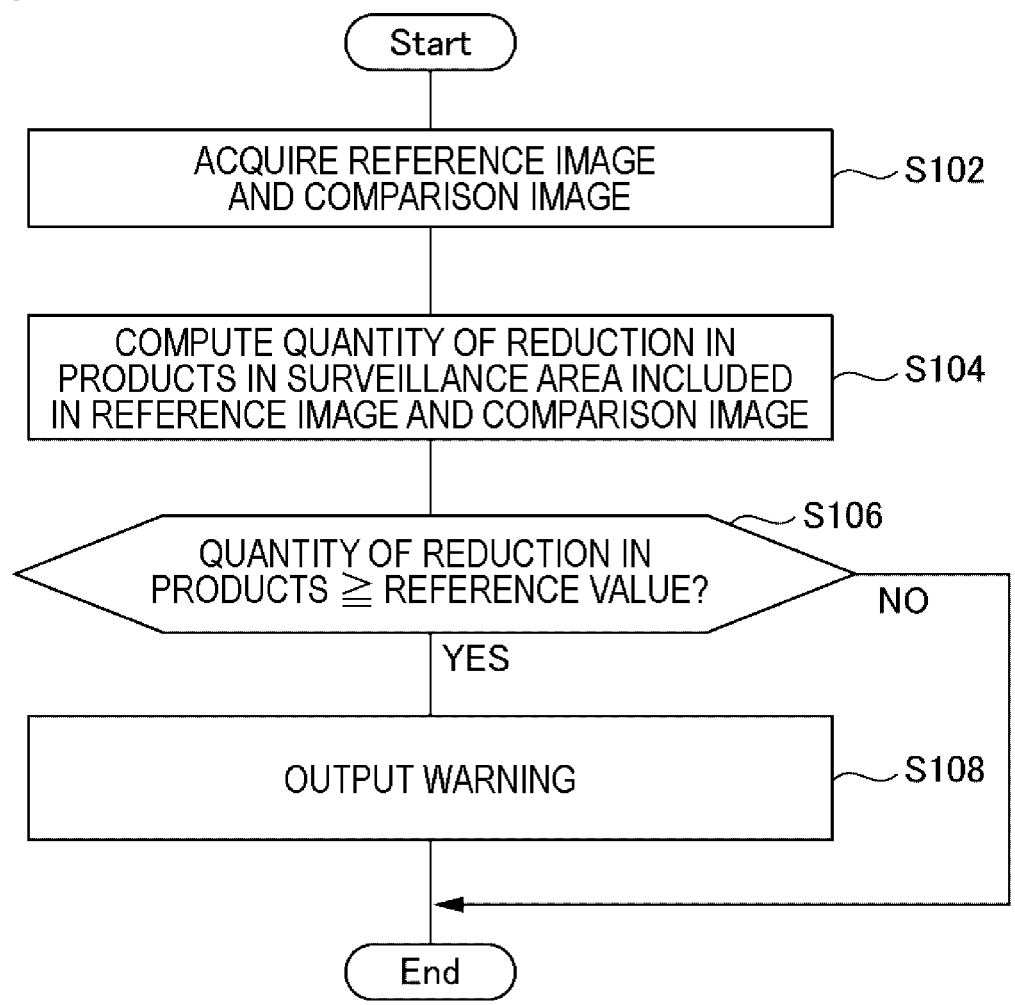
FIG. 4 is a flowchart illustrating a flow of a process executed by the information processing apparatus according to the first embodiment.

FIG. 4 is a flowchart illustrating a flow of a process executed by the information processing apparatus 2000 according to the first embodiment. The computation unit 2040 acquires the reference image 13 and the comparison image 14 (S102). The computation unit 2040 computes the quantity of reduction in products in the surveillance area 15 included in the reference image 13 and the comparison image 14 (S104). The warning unit 2060 determines whether or not the quantity of reduction in products is equal to or larger than the reference value (S106). In a case where the quantity of reduction in products is equal to or larger than the reference value (S106: YES), the warning unit 2060 outputs the warning (S108). In a case where the quantity of reduction in products is less than the reference value (S106: NO), the process of FIG. 4 ends.

Here, a single captured image 12 may include a plurality of surveillance areas 15. For example, in a case where the captured image 12 includes a product shelf having a plurality of trays, the surveillance areas 15 may be individually set for the respective trays. In this case, the processes in S104 to S108 are executed for each of the plurality of surveillance areas 15.

In addition, different captured images 12 may be used for each of the plurality of surveillance areas 15. In this case, the processes in S102 to S108 are executed for each of the plurality of surveillance areas 15.

<Method for Acquiring Captured Image 12: S102>

The computation unit 2040 acquires the reference image 13 and the comparison image 14 (S102). Here, a method for acquiring the captured images 12 by the computation unit 2040 is optional. For example, the computation unit 2040 receives the captured images 12 which are transmitted from the camera 10. In another example, the computation unit 2040 accesses the camera 10 and acquires the captured images 12 which are stored in the camera 10.

Note that, the camera 10 may store the captured images 12 in a storage unit provided on the outside of the camera 10. In this case, the computation unit 2040 accesses the storage unit and acquires the captured images 12.

In a case where the information processing apparatus 2000 is realized by the camera 10, the information processing apparatus 2000 acquires the captured images 12 which are generated by the information processing apparatus 2000 itself. In this case, the captured images 12 are stored in, for example, the memory 1060 or the storage device 1080, which is inside the information processing apparatus 2000 (refer to FIG. 3). Here, the computation unit 2040 acquires the captured images 12 from the memory 1060 or the storage device 1080.

<Reference Image 13>

The reference image 13 is an image which is handled as a reference used to compute a degree of reduction in products included in the surveillance area 15 of the comparison image 14. The computation unit 2040 acquires the reference image 13 to be handled as the reference from the captured images 12 generated by the camera 10.

There are various methods for determining which captured image 12 is to be handled as the reference image 13. Hereinafter, some of the methods will be illustrated. Note that, a method for determining which captured image 12 is to be handled as the comparison image 14 will be described later.

First Example

Figure 5:
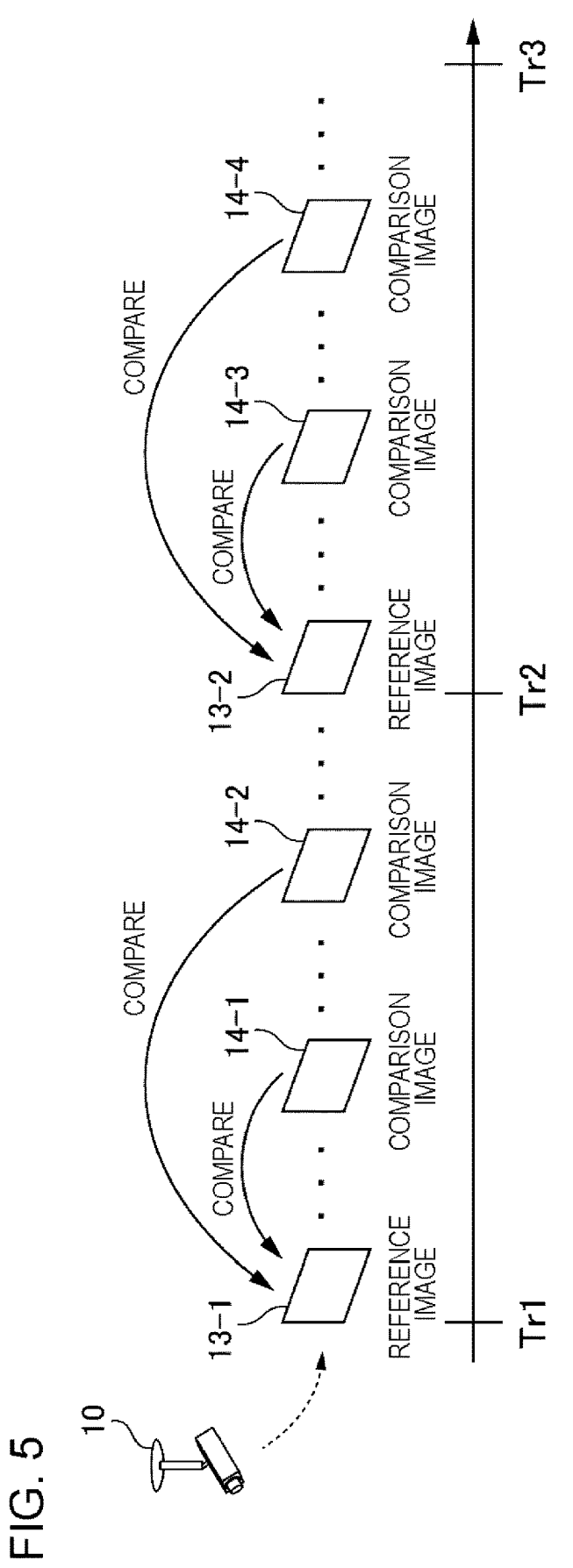
FIG. 5 is a diagram illustrating a case where a captured image, which is generated at a predetermined time, is handled as a reference image.

The information processing apparatus 2000 handles the captured image 12, which is generated at a predetermined time, as the reference image 13. FIG. 5 is a diagram illustrating a case where the captured image 12, which is generated at the predetermined time, is handled as the reference image 13. In FIG. 5, the predetermined time includes Tr1, Tr2, and Tr3.

In a case where the quantity of reduction in products is computed for the comparison images 14 (for example, a comparison image 14-1 and a comparison image 14-2) which is generated at each time t that satisfies Tr1≤t<Tr2, the captured image 12 generated at the predetermined time Tr1 is set to the reference image (a reference image 13-1). On the other hand, in a case where the quantity of reduction in products is computed for the comparison images 14 (for example, a comparison image 14-3 and a comparison image 14-4) which is generated at each time t that satisfies Tr2≤t<Tr3, a captured image 12 generated at the predetermined time Tr2 is set to the reference image (reference image 13-2).

A method for determining the above-described predetermined time is optional. For example, it is assumed that the information processing apparatus 2000 is used for a business hour of the store where a product corresponding to a surveillance target is placed. In this case, for example, it is assumed that an opening time of the store on a certain day is an initial predetermined time Tr1. Furthermore, a predetermined time subsequent to Tr1 is determined at predetermined time intervals. For example, 10 minutes after from the predetermined time Tr1 is determined as the predetermined time Tr2, and further 10 minutes after from the predetermined time Tr2 is determined as the predetermined time Tr3.

Second Example

Figure 6:
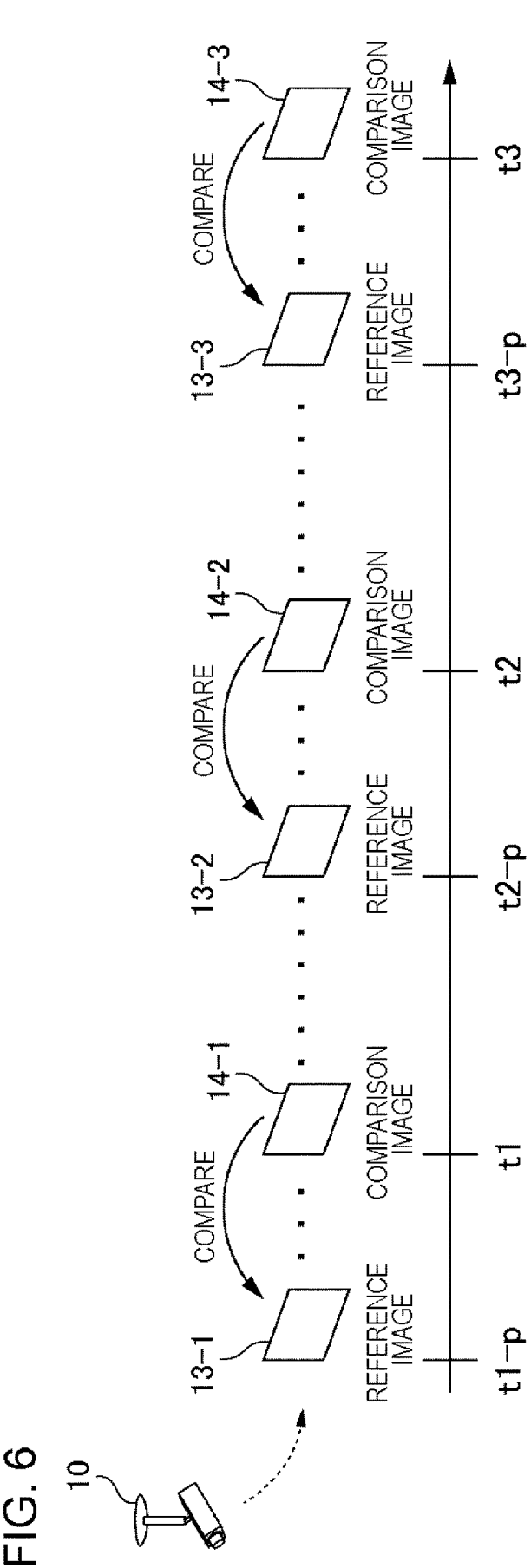
FIG. 6 is a diagram illustrating a case where a captured image, which is generated predetermined time before a time in which a comparison image is generated, is handled as the reference image.

The information processing apparatus 2000 handles, as the reference image 13, the captured image 12 that is generated the predetermined time before (for example, 10 minutes before) the time at which the comparison image 14 is generated. FIG. 6 is a diagram illustrating a case to handle, as the reference image 13, the captured image 12 that is generated the predetermined time before the time at which the comparison image 14 is generated.

In FIG. 6, the captured images 12 that are respectively generated at the time t1, t2, and t3, are handled as the comparison image 14. In addition, the above-described predetermined time is p. Here, the captured images 12 that are respectively generated at time t1−p, t2−p, and t3−p, are handled as the reference image 13.

<Comparison Image 14>

The comparison image 14 is a captured image 12 generated by the camera 10, and is generated at a time after the reference image 13 is generated. There are various methods for determining which of the plurality of captured images 12 generated by the camera 10 is to be handled as the comparison image 14.

For example, the computation unit 2040 handles all the respective captured images 12, which are generated by the camera 10, as the comparison image 14. In another example, the computation unit 2040 extracts the captured image 12 to be handled as the comparison image 14 from the plurality of captured images 12 generated by the camera 10, at predetermined time intervals. More specifically, the i-th comparison image 14 is the captured image 12 generated at a time Ts+(i−1)*q. Here, Ts indicates a time at which the first comparison image 14 is generated and q indicates the predetermined time interval.

In another example, in a case where the reference image 13 is generated at the predetermined time (the above-described case of the first example), the computation unit 2040 may handle, as the comparison image 14, the captured image 12 generated predetermined time after the reference image 13 is generated. For example, in a case where the reference images 13 are generated at the predetermined time Tr1, Tr2, and Tr3, the captured images 12 which are generated at the time Tr1−p, Tr2−p, and Tr3−p are respectively handled as the comparison image 14 (p is the above-described predetermined time).

<Surveillance Area>

There are various methods for determining a location of the surveillance area 15 in the captured image 12. For example, the location of the surveillance area 15 in the captured image 12 is determined in advance using coordinates on the captured image 12. For example, in a case where the surveillance area 15 has a rectangular shape, coordinates of the upper-left vertex of the surveillance area 15 and coordinates of the lower-right vertex of the surveillance area 15 are determined. In a case where the surveillance area 15 has a polygonal shape other than the rectangular shape, for example, coordinates of each of the vertexes of the surveillance area 15 are determined.

In another example, the surveillance area 15 may be determined using a location of the surveillance target in a real world. In this case, the information processing apparatus 2000 converts the location of the surveillance target in the real world into a location on the captured image 12. It is possible to realize a process for converting the location on the real world into the location on the captured image using camera parameters (an installation location, an imaging direction, an angle of view, and the like) of the camera which generates the captured image. Note that, it is possible to use a well-known technology as the process for converting the location of the real world into the location on the captured image using the camera parameters.

<Computation of Quantity of Reduction in Products: S104>

The computation unit 2040 computes the quantity of reduction in products in the surveillance area 15 included in the reference image 13 and the comparison image 14 (S104). For example, the computation unit 2040 extracts a differential area between the surveillance area in the comparison image 14 and the surveillance area 15 in the reference image 13, and computes the quantity of reduction in products based on a size of the differential area.

Figure 7:
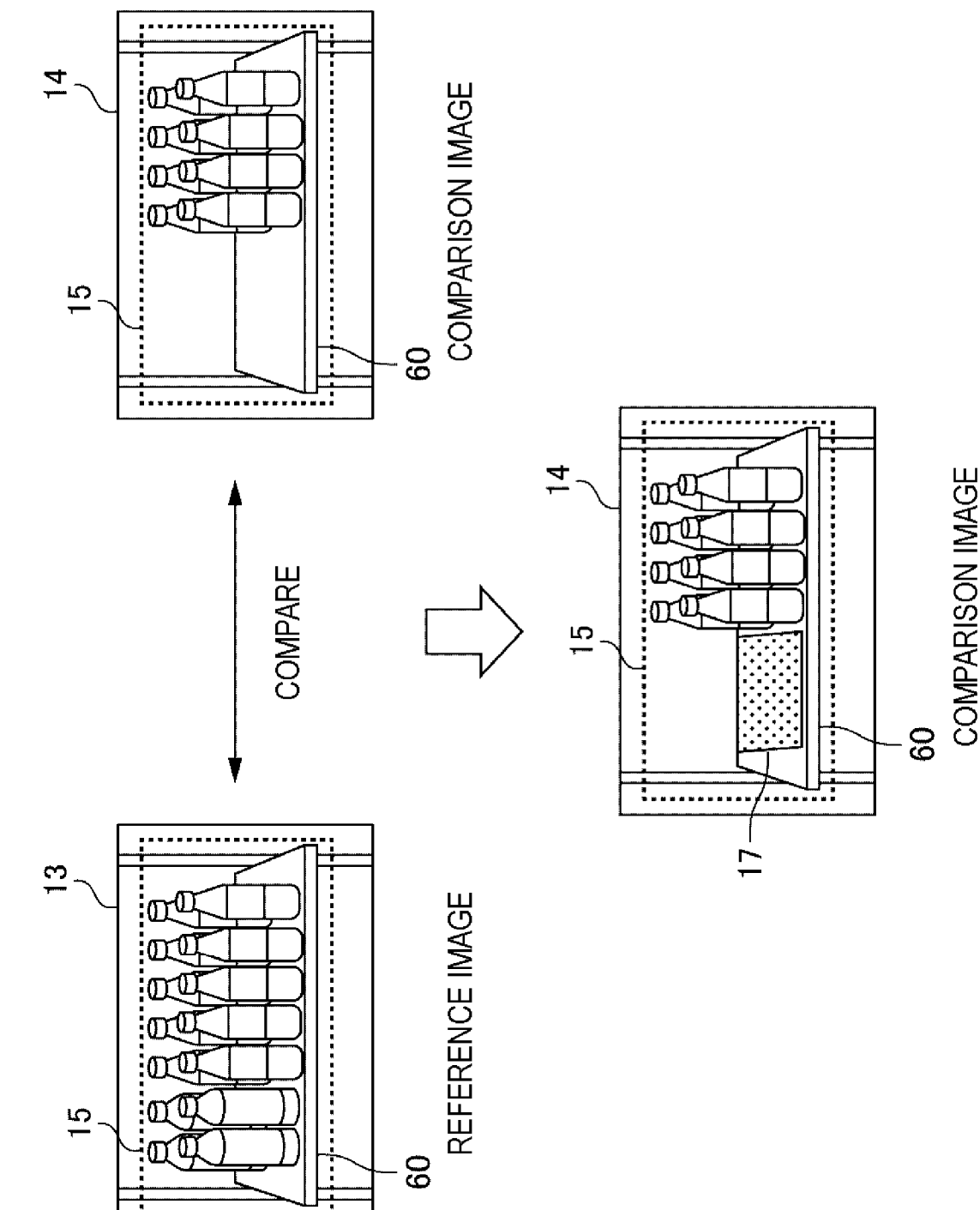
FIG. 7 is a diagram illustrating a differential area between shelf parts.

Here, it is preferable that the computation unit 2040 computes a difference in a front surface (for example, an upper surface of the product shelf) of a location where the products are placed, as the differential area of the surveillance area 15. FIG. 7 is a diagram illustrating a differential area of the shelf part. The computation unit 2040 computes a difference between the reference image 13 and the comparison image 14 for a tray 60 included in the surveillance area 15. As a result, a differential area 17 is computed as the differential area between the reference image 13 and the comparison image 14. Note that, in a case where it is assumed that the difference in the upper surface of the location where the products are placed is the differential area, it is preferable that the camera 10 is installed to look down the product exhibition location from an upper side.

In a case where there is a plurality of reference images 13, for example, the computation unit 2040 handles, as the reference image 13 to be compared with a certain comparison image 14, the reference image 13 that is generated before the comparison image 14 and whose generation time is closest to the generation time of the comparison image 14.

It is possible to use various measuring rules to represent the quantity of reduction in products. For example, the measuring rule to represent the quantity of reduction in products is a dimension of the differential area. In this case, the computation unit 2040 handles the size of the differential area as the quantity of reduction in products. Specifically, in a case where the size of the differential area is n pixels (n is a positive integer), the computation unit 2040 sets the quantity of reduction in products to n pixels.

In another example, the measuring rule to represent the quantity of products is a ratio of the differential area to the surveillance area 15. For example, it is assumed that a size of the surveillance area 15 is m pixels (m is a positive integer) and the size of the differential area is n pixels. In this case, the computation unit 2040 sets the quantity of reduction in products to "n/m".

In another example, the measuring rule to represent the quantity of products is the quantity of products (the number, a volume, a weight, or the like). For example, in a case where the number of reduced products is n, the quantity of reduction in products is "n". The computation unit 2040 computes the quantity of products corresponding to the size of the differential area, and handles the quantity as the quantity of reduction in products.

In another example, the measuring rule to represent the quantity of products is an evaluation value of the product. The evaluation value of the product is, for example, a price of the product. For example, in a case where the total amount of price of the reduced products is n yen, the quantity of reduction in products is "n yen". In another example, the evaluation value of the product is a score which represents value, importance, or the like of the product. For example, in a case where a score per a unit quantity of the product (for example, one) is s (s is a positive real number) and n products are reduced, the score which represents the quantity of reduction in products is s*n. The computation unit 2040 computes the evaluation value of the product corresponding to the size of the differential area, and handles the evaluation value as the quantity of reduction in products.

The measuring rule, which is used to compute the quantity of reduction in products by the computation unit 2040, may be determined in advance in the computation unit 2040 or may be stored in the storage unit which can be accessed by the computation unit 2040. In another example, the computation unit 2040 may acquire information which indicates the measuring rule used to determine the reference value of the surveillance area 15, and may compute the quantity of reduction in products using the same measuring rule as the reference value.

<<Method for Computing Quantity of Reduction in Products Using 3-Dimensional Camera>>

It is assumed that a 3-dimensional camera is used as the camera 10. In a case where the 3-dimensional camera is used, it is possible to acquire a depth for each image area (for example, for each pixel) in addition to the image.

Here, the computation unit 2040 may compute the quantity of reduction in products using a depth of the surveillance area 15 in the reference image 13 and a depth of the surveillance area 15 in the comparison image 14. Hereinafter, the method will be described in detail.

Figure 8A:
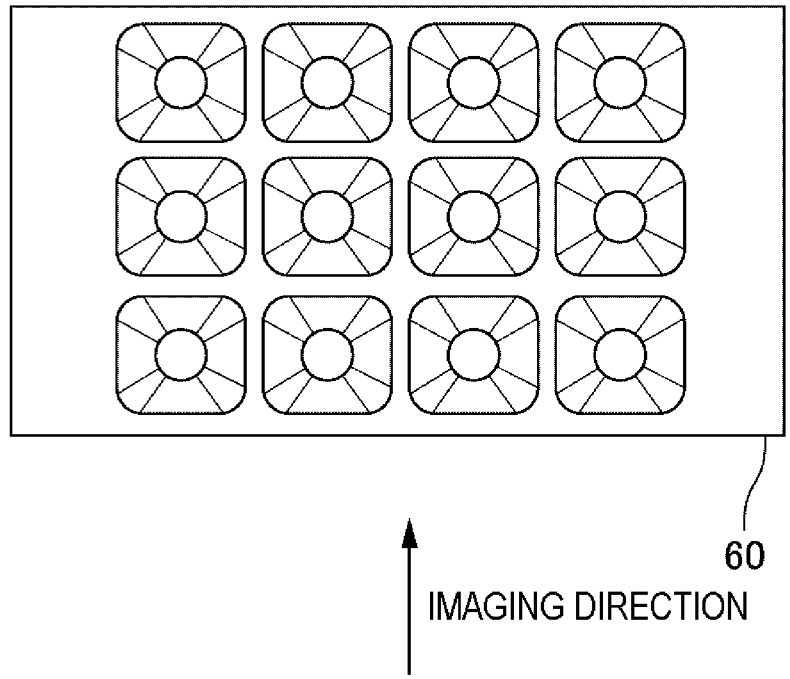
FIGS. 8A and 8B are diagrams illustrating a method for computing the quantity of reduction in products using a depth of a surveillance area.

FIGS. 8A, 8B, 9A and 9B are diagrams illustrating the method for computing the quantity of reduction in products using the depth of the surveillance area 15. FIG. 8A is a plan view in which the tray 60, which is included in the surveillance area 15, is viewed from an upper side at the time when the reference image 13 is generated.

Figure 8B:
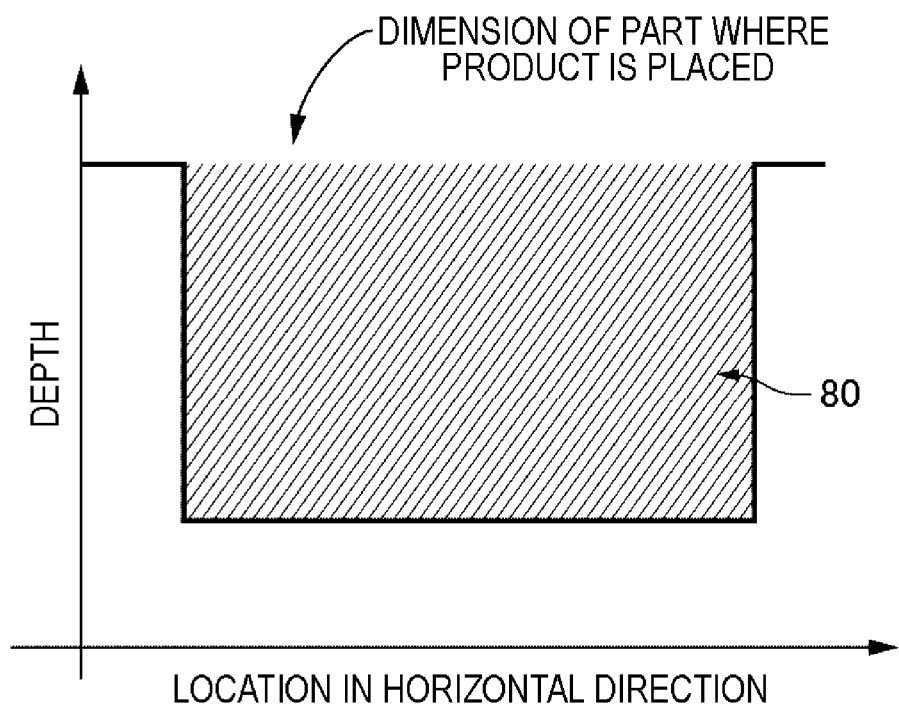

FIG. 8B is a diagram illustrating a graph which illustrates a depth on the tray 60 of FIG. 8A. A depth of the location where the product is placed is small. Furthermore, a dimension of a part where the product is placed in the tray 60 is a dimension of an area 80.

Figure 9A:
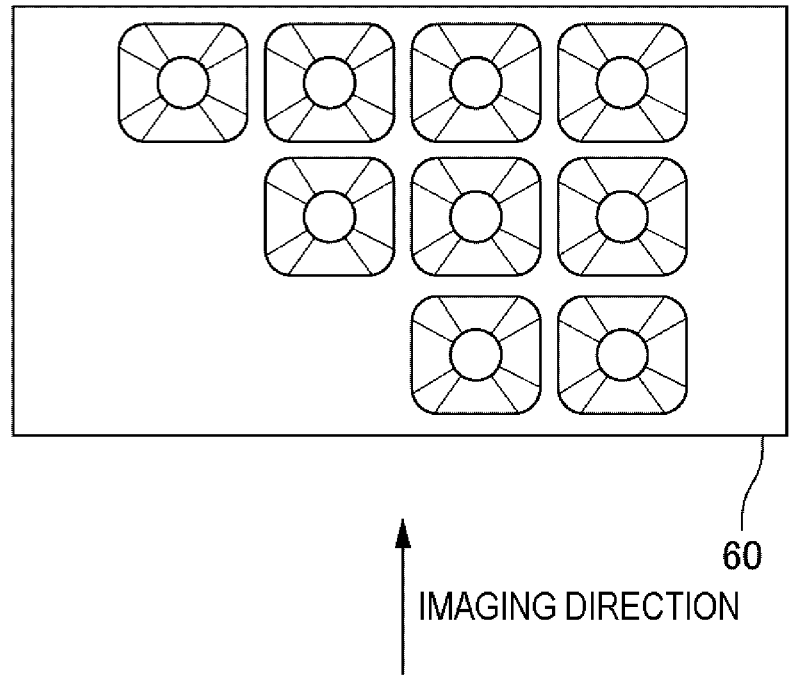
FIGS. 9A and 9B are diagrams illustrating the method for computing the quantity of reduction in products using the depth of the surveillance area.

FIG. 9A is a plan view in which the tray 60, which is included in the surveillance area 15, is viewed from the upper side at the time when the comparison image 14 is generated. In FIG. 9A, the number of products is reduced, compared to FIG. 8A.

Figure 9B:
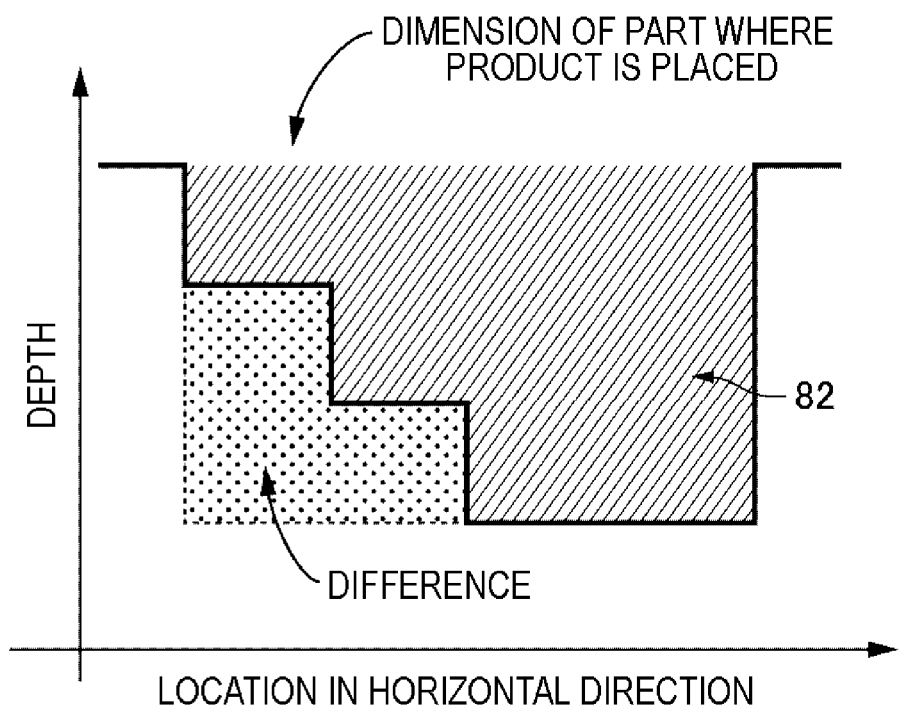

FIG. 9B is a graph illustrating a depth on the tray 60 of FIG. 9A. The dimension of the tray 60 at the part where the product is placed is a dimension of an area 82.

Here, in a case where the area 82 of FIG. 9B is compared with the area 80 of FIG. 8B, the dimension of the area 82 becomes smaller than the dimension of the area 80 as the number of products is reduced.

Accordingly, the computation unit 2040 computes the quantity of reduction in products based on a difference between the dimension of the area 82 and the dimension of the area 80.

In the method for computing the quantity of reduction in products by taking the depth of the surveillance area 15 into consideration, there is an advantage in that it is possible to accurately compute the quantity of reduction in products, compared to a case where the depth of the surveillance area 15 is not taken into consideration. Specifically, in a case where the product exhibition location is imaged from a direction which is close to the front surface, there is a problem in that an upper surface of the tray is seldom captured in the captured image 12. However, even in a case where the product exhibition location is imaged from the direction which is close to the front surface, it is possible to acquire the depth of the surveillance area 15 using the 3-dimensional camera. Accordingly, in a case where the product exhibition location is imaged from the direction which is close to the front surface, it is specifically preferable to take the depth of the surveillance area 15 into consideration.

<<Association Between Size of Differential Area and Quantity of Products>>

As described above, in a case where the quantity of products or the evaluation value is set to the measuring rule, the computation unit 2040 computes the quantity of products or the evaluation value, which corresponds to the size of the differential area. For this reason, association between the size of the differential area and the quantity of products in each measuring rule is defined in advance. For example, for each measuring rule, the quantity of products per unit dimension (for example, one pixel) of the surveillance area 15 is determined in advance.

FIG. 10 is a diagram illustrating the quantity of products for each unit dimension of the surveillance area 15 using various measuring rules. A table of FIG. 10 is called a table 500. In an example, the unit dimension of the image area is one pixel. The table 500 includes a surveillance area ID 502, a measuring rule 504, and a value 506. The surveillance area Identifier (ID) 502 indicates an identifier of the surveillance area. The measuring rule 504 indicates a name of the measuring rule (number, volume, weight, price, or the like). The value 506 indicates the quantity of products for each unit dimension of the image area.

For example, the record at the first line of the table 500 indicates that, for the surveillance area 15 whose identifier is 001, the quantity of products for each unit dimension is "0.01 yen" in a measuring rule "price". In addition, the record at the second line indicates that, for the surveillance area 15 whose identifier is 001, the quantity of products for each unit dimension of the surveillance area 15 is "0.05" in a measuring rule "number".

The table 500 may be stored inside the information processing apparatus 2000 or may be stored on the outside of the information processing apparatus 2000.

Note that, in a case where only one surveillance area 15 is included in the captured image 12 or in a case where the quantity of products for each unit dimension of the surveillance area 15 is common to all the surveillance areas 15, the table 500 may not include the surveillance area ID 502.

In addition, in a case where the 3-dimensional camera is used and the quantity of reduction in products is computed based on the depth of the surveillance area 15, for example, the quantity of products for each unit dimension of the tray included in the surveillance area 15 is defined instead of the quantity of products for each unit dimension of the surveillance area 15.

There are various methods for setting the quantity of products for each unit dimension of the surveillance area 15 (method for generating the record of the table 500). For example, the information processing apparatus 2000 receives an input, which is used to specify the quantity of products for each unit dimension of the surveillance area 15, from a user (a sales clerk, an observer, or the like of a surveillance target store) of the information processing apparatus 2000. It is possible for the user to acquire information, which indicates the products and the quantity of products exhibited in each exhibition location, in advance. Here, the user manually inputs the quantity of products for each unit dimension of the surveillance area 15 based on the information.

Here, the user may input the total amount of products included in the surveillance area 15 instead of the quantity of products for each unit dimension of the surveillance area 15. For example, in a case where the surveillance area 15 is one tray of the product shelf, the user inputs the total number of products exhibited on the tray or the total amount of price. In this case, the information processing apparatus 2000 computes the quantity of products for each unit dimension of the surveillance area 15 by dividing the input quantity of products by the dimension of the surveillance area 15.

Figure 11:
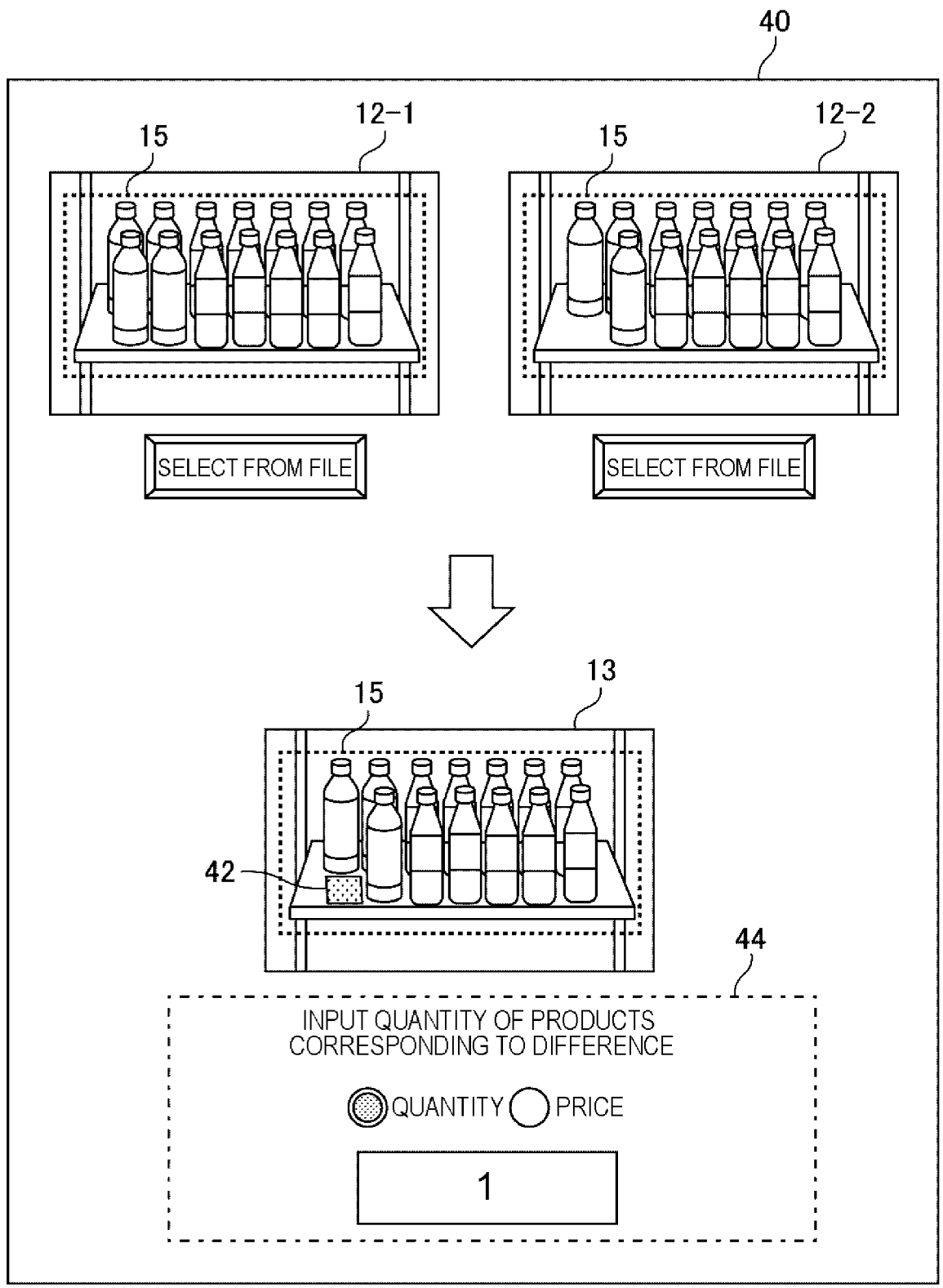
FIG. 11 is a diagram illustrating a method for setting the quantity of products for each unit dimension of the surveillance area.

In another example, the quantity of products for each unit dimension of the surveillance area 15 may be set using a method below. FIG. 11 is a diagram illustrating a method for setting the quantity of products for each unit dimension of the surveillance area 15. A setting screen 40 is a screen used to set the quantity of products for each unit dimension of the surveillance area 15.

The user performs input to specify two captured images 12-1 and 12-2. For example, the user specifies the captured image 12-1 and the captured image 12-2 from the captured images 12 stored in the storage unit. Here, the user specifies the captured images, which have different quantities of products in the surveillance area 15, as the captured image 12-1 and the captured image 12-2.

The information processing apparatus 2000 computes a differential area between the captured image 12-1 and the captured image 12-2. Furthermore, the information processing apparatus 2000 displays, on the setting screen 40, a captured image 12-3 that is an image on which a differential area 42 is superimposed, the differential area 42 representing the difference between the captured image 12-1 and the captured image 12-2.

The user inputs the quantity of products corresponding to the differential area 42 to an input area 44. Specifically, first, the user selects the measuring rule which represents the quantity of products. Furthermore, the user inputs the quantity of products corresponding to the differential area 42 using the selected measuring rule. For example, in the example of FIG. 11, "quantity" is selected as the measuring rule. Here, the user inputs the number "1".

The information processing apparatus 2000 computes the quantity of products for each unit dimension of the surveillance area 15 by dividing the quantity of products, which is input to the input area 44, by a dimension of the differential area 42.

Note that, the captured image 12-1 and the captured image 12-2 may be captured images generated by operating the camera 10 to surveil the exhibition location for surveillance, or may be captured images generated by operating a separate camera 10 to be used on the setting screen 40.

<Comparison with Reference Value: S106>

The warning unit 2060 determines whether or not the quantity of reduction in products is equal to or larger than the reference value (S106). It is assumed that the reference value is determined using the same measuring rule as the measuring rule which represents the quantity of reduction in products. For example, in a case where the quantity of reduction in products is represented using the size of the differential area, the reference value indicates the predetermined number of pixels. In another example, in a case where the quantity of reduction in products represents the quantity of products or the evaluation value, the reference value indicates the predetermined quantity or the evaluation value.

Note that, in a case where the evaluation value of the products is used as the reference value, the warning is output in a case where a product having a larger value than the value represented by the reference value disappears. Accordingly, there is an advantage in that it is possible to represent a scale of damage of the theft for which the warning unit 2060 should output the warning, using a measuring rule easily understandable for a person such as a value of a thieved product.

A method for determining the reference value is optional. For example, the warning unit 2060 uses the reference value which is fixedly set for the warning unit 2060 in advance. In another example, a setting file or the like, in which the reference value is described is read from the storage unit, and the reference value described in the setting file may be used. Another example of the method for determining the reference value will be described in an embodiment which will be described later. Note that, it is preferable that the reference value is a value corresponding to, for example, 50% or less than the quantity of products included in the reference image 13.

<Output of Warning: S108>

In a case where the quantity of reduction in products is equal to or larger than the reference value, the warning unit 2060 outputs the warning (S108). Here, there are various methods for outputting the warning by the warning unit 2060. For example, the warning unit 2060 outputs the warning from an output device which is connected to the information processing apparatus 2000. The output device is, for example, a display device or a speaker.

Figure 12:
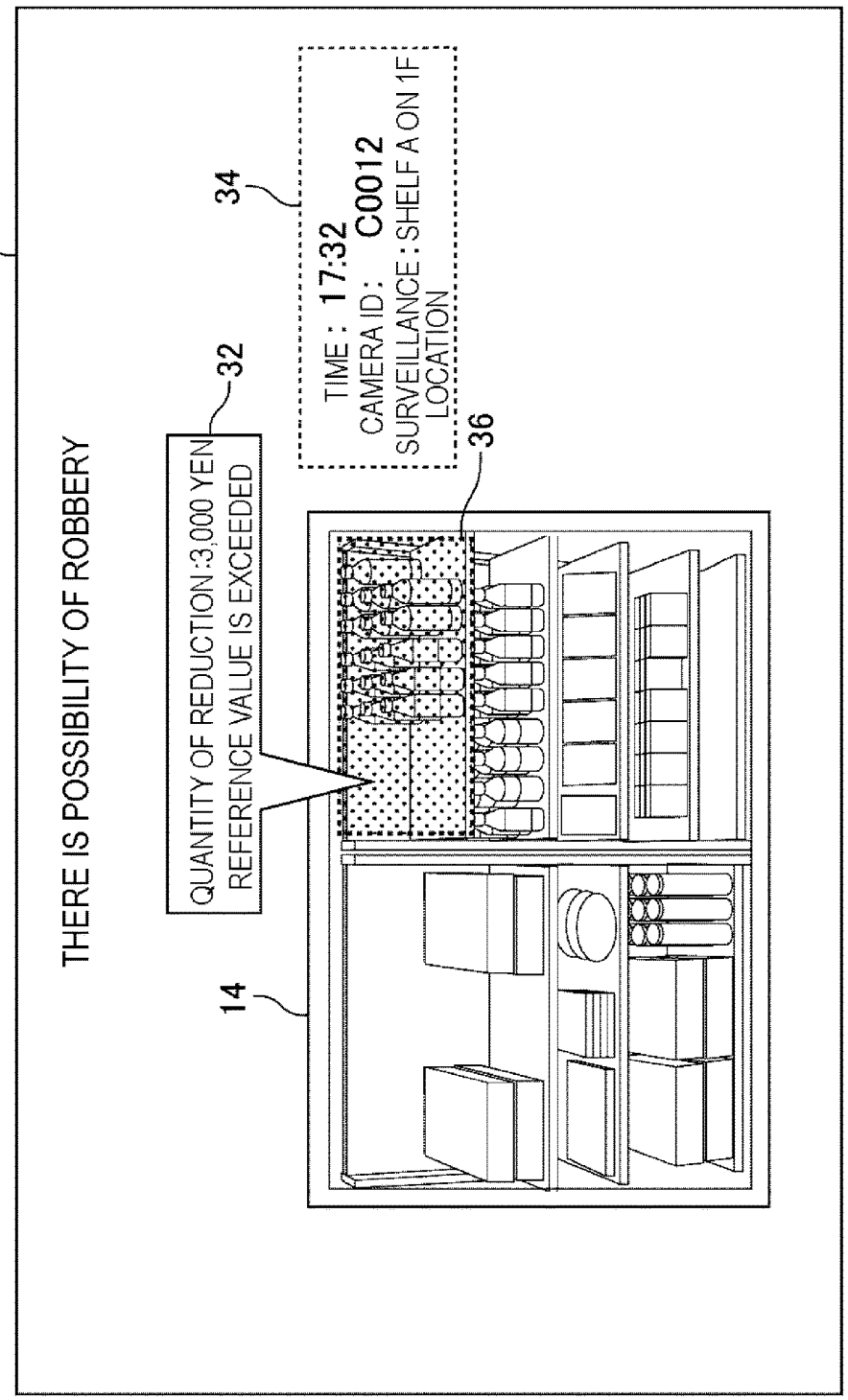
FIG. 12 is a diagram illustrating a warning screen which is displayed on a display device.

FIG. 12 is a diagram illustrating a warning screen 30 which is displayed on the display device. On the warning screen 30, the comparison image 14, in which it is determined that the quantity of reduction in products is equal to or larger than the reference value, is displayed. An area 36 represents the surveillance area 15 in which it is determined that the quantity of reduction in products is equal to or larger than the reference value. Information 32 indicates the quantity of reduction in products and a message which notifies that the quantity of reduction in products is larger than the reference value. Information 34 indicates information related to the comparison image 14 in which it is determined that the quantity of reduction in products is equal to or larger than the reference value. Specifically, the information 34 indicates the time in which the comparison image 14 is generated, an identifier of the camera 10 which generates the comparison image 14, and a location which is surveilled by the camera 10.

By viewing the warning screen 30, it is possible for the sales clerk, the observer, or the like to easily recognize (1) that there is a possibility that the theft occurs and (2) when, where, and how much the products are reduced.

The warning which is output from the warning unit 2060 may be output from one or more mobile terminals. For example, the mobile terminals are those possessed by the sales clerk, a security guard, and the like in the store. The mobile terminals acquiring the warning output from the warning unit 2060 outputs the warning from display devices or speakers thereof. For example, a warning screen, which is the same as in FIG. 12, is output to the display devices of the mobile terminals.

Second Embodiment

Figure 13:
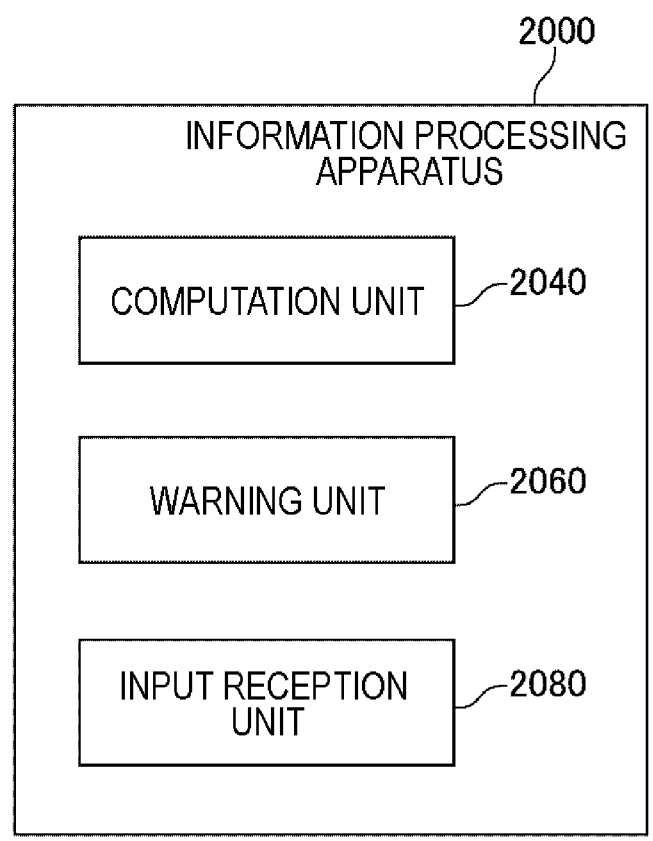
FIG. 13 is a block diagram illustrating an information processing apparatus according to a second embodiment.

FIG. 13 is a block diagram illustrating an information processing apparatus 2000 according to the second embodiment. Other than matters described below, the information processing apparatus 2000 according to the second embodiment includes the same functions as the information processing apparatus 2000 according to the first embodiment.

The information processing apparatus 2000 according to the second embodiment includes an input reception unit 2080. The input reception unit 2080 receives an input of the reference value. Note that, in a case where the plurality of surveillance areas 15 are included in the captured image 12, the input reception unit 2080 may receive an input of one reference value which is common to all the surveillance areas, or may receive inputs of individual reference values for the respective surveillance areas.

Hereinafter, a method for inputting the reference value will be described in detail.

Figure 14:
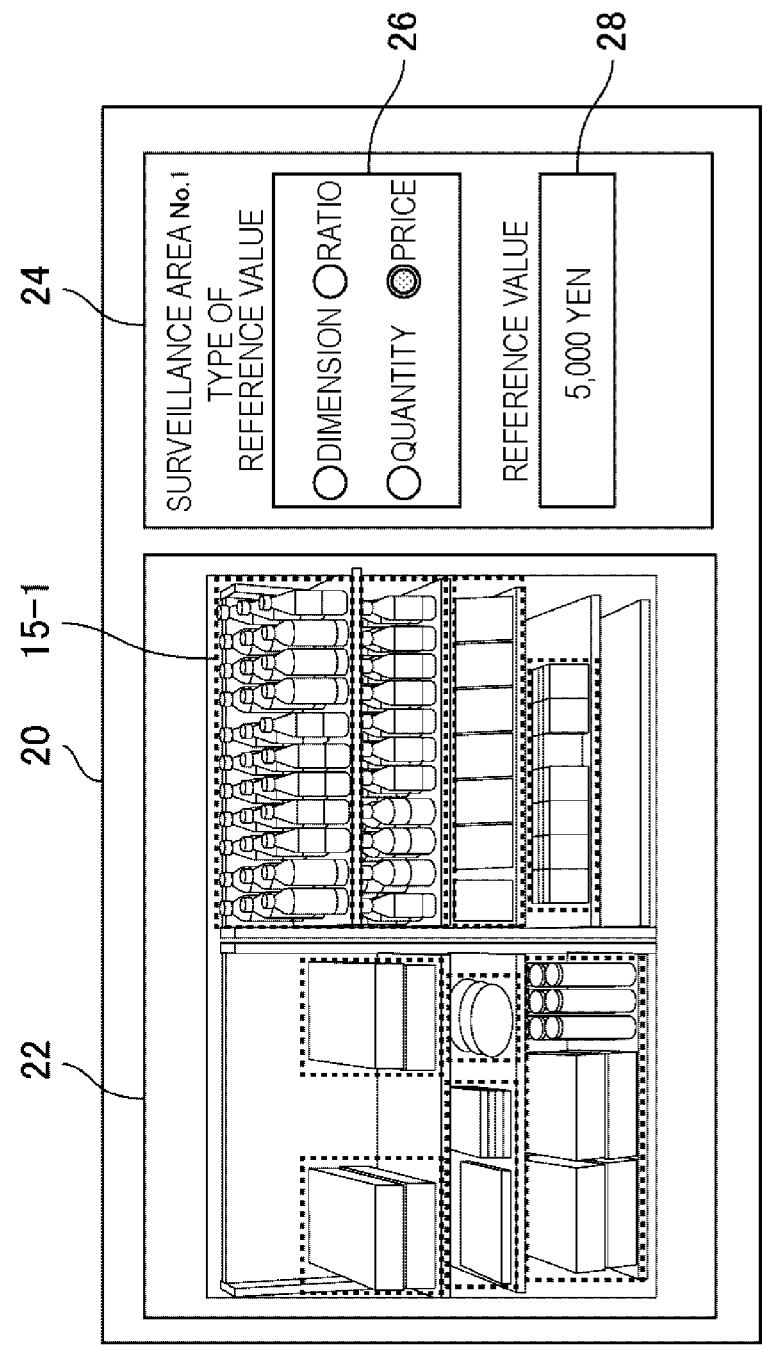
FIG. 14 is a diagram illustrating a method for inputting a reference value.

FIG. 14 is a diagram illustrating the method for inputting the reference value. A setting screen 20 is a screen used to receive the input of the reference value from the user. A window 22 is a window used to specify the surveillance area in which the reference value is set. A window 24 is a window used to input the reference value for the specified surveillance area.

First, the user specifies the surveillance area 15, which is a target of the input of the reference value, from the surveillance areas 15 on the captured image 12 displayed in the window 22. For example, the user specifies the surveillance area 15 by tapping or clicking the surveillance area 15 which is desired to be specified. Note that, in a case where a common reference value is set for all the surveillance areas 15, it is not necessary to enable the surveillance area 15 to be selected.

In addition, it may be able to add a new surveillance area 15 in the window 22. For example, the user draws an area on the captured image 12 by performing an operation such as drag. Then, the drawn area is added as the new surveillance area 15.

The user inputs the reference value for the specified surveillance area 15. An input area 26 is an area used to specify a type of the reference value (the measuring rule which represents the quantity of products). In FIG. 14, "product price" is specified.

An input area 28 is an area used to input the reference value using the specified measuring rule. In FIG. 14, the product price is specified as the measuring rule, and thus the reference value is input with price "2000 yen".

For example, the user inputs a numerical value which represents the reference value by performing key input in a state in which the input area 28 is focused. However, the method for inputting the reference value is not limited to the key input. Hereinafter, some methods for inputting the reference value other than the key input will be illustrated.

Figure 15:
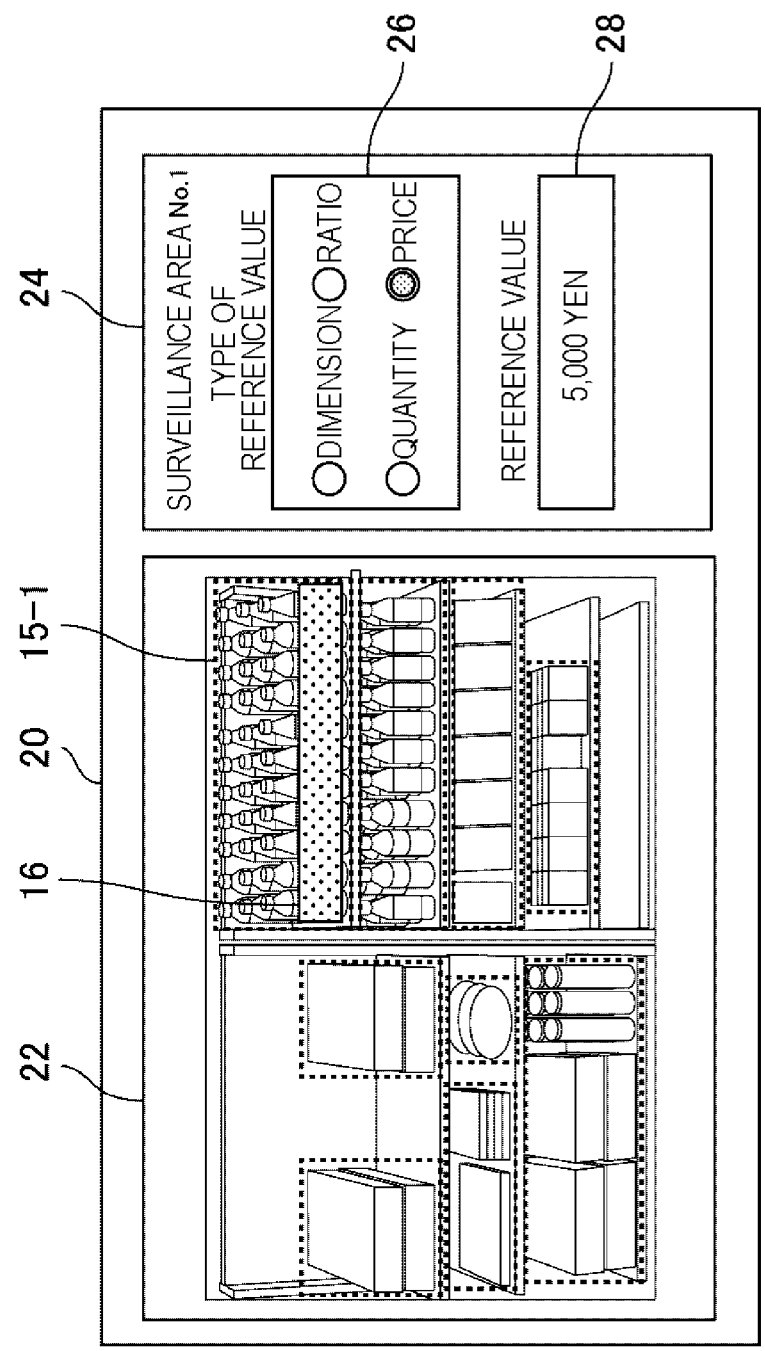
FIG. 15 is a first diagram illustrating the method for inputting the reference value using a method other than a key input method.

For example, the input reception unit 2080 receives an input to draw an area in the surveillance area 15. Furthermore, the input reception unit 2080 computes the reference value using a size of the drawn area. FIG. 15 is a first diagram illustrating the method for inputting the reference value using a method other than the key input. In FIG. 15, the user performs an input to draw an area 16 in a specified surveillance area 15-1. The input reception unit 2080 computes the reference value using a size of the area 16.

As described above, in the method for inputting the reference value using the method for drawing the area 16 in the surveillance area 15, there is an advantage in that it is possible to easily and intuitively input the reference value, compared to a method for directly inputting the reference value using the numerical value.

In a case where the type of the reference value is "dimension", the input reception unit 2080 sets the size of the area 16 to the reference value without change. For example, in a case where the size of the area 16 is 10,000 pixels, the input reception unit 2080 sets the reference value to "10,000 pixels".

In a case where the type of the reference value is "ratio", the input reception unit 2080 sets the reference value to a ratio of the size of the area 16 to the size of the surveillance area 15. For example, it is assumed that the size of the surveillance area 15 is 30,000 pixels and the size of the area 16 is 10,000 pixels. In this case, the input reception unit 2080 sets the reference value to "⅓".

In a case where the type of the reference value is "quantity", the input reception unit 2080 computes the reference value based on the total quantity of products included in the surveillance area 15, the size of the surveillance area 15, and the size of the area 16. For example, it is assumed that the total quantity of products included in the surveillance area 15 is 30, the size of the surveillance area 15 is 30,000 pixels, and the size of the area 16 is 10,000 pixels. In this case, the input reception unit 2080 sets the reference value to "10" which is ⅓ of 30.

Note that, the total quantity of products included in the surveillance area 15 may be input by the user, or may be determined in advance with respect to the surveillance area 15. In addition, in a case where the input reception unit 2080 performs object recognition for the surveillance area 15 of the captured image 12 which is displayed in the window 22, the total quantity of products included in the surveillance area 15 may be computed.

In a case where the type of the reference value is "price", the input reception unit 2080 computes the reference value based on the total price of products included in the surveillance area 15, the size of the surveillance area 15, and the size of the area 16. For example, it is assumed that the total price of products included in the surveillance area 15 is 3,000 yen, the size of the surveillance area 15 is 30,000 pixels, and the size of the area 16 is 10,000 pixels. In this case, the input reception unit 2080 sets the reference value to "1000 yen" which is ⅓ of 3,000 yen.

Note that, the total price of products included in the surveillance area 15 may be input by the user or may be determined in advance with respect to the surveillance area 15. In addition, in a case where the input reception unit 2080 performs the object recognition for the surveillance area 15 of the captured image 12 displayed in the window 22, the total price of products included in the surveillance area 15 may be computed. Specifically, in a case where the input reception unit 2080 performs the object recognition for the surveillance area 15, identification of products included in the surveillance area 15 and computation of the number of products are performed. Subsequently, the input reception unit 2080 searches a product database in which product price information is stored, and acquires a unit price of the products included in the surveillance area 15. Then, the computation unit 2040 multiplies the acquired unit price by the number of products to compute the total price of products included in the surveillance area 15.

Example of Hardware Configuration

A hardware configuration of the computer, which realizes the information processing apparatus 2000 according to the second embodiment, is represented with reference to, for example, FIG. 3 as the same as in the first embodiment. However, in the storage device 1080 of the computer 1000, which realizes the information processing apparatus 2000 according to the embodiment, program modules, which realize functions of the information processing apparatus 2000 according to the embodiment, are further stored.

Advantageous Effects

The information processing apparatus 2000 according to the embodiment receives the input of the reference value from the user. In this manner, it is possible for the user to freely set the reference value. Accordingly, convenience of the information processing apparatus 2000 is improved.

Third Embodiment

Figure 16:
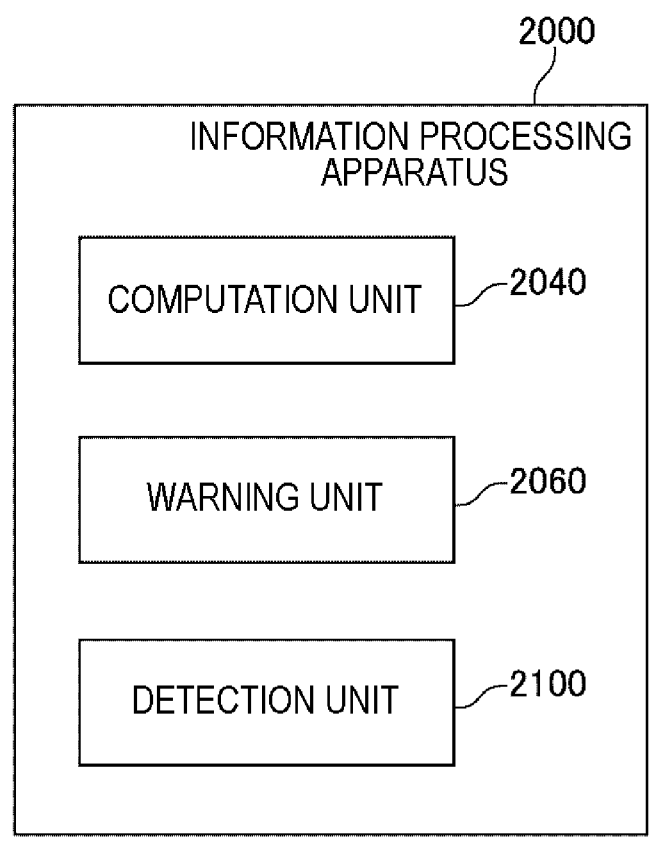
FIG. 16 is a block diagram illustrating an information processing apparatus according to a third embodiment.

FIG. 16 is a block diagram illustrating an information processing apparatus 2000 according to a third embodiment. Other than matters described below, the information processing apparatus 2000 according to the third embodiment includes the same functions as the information processing apparatus 2000 according to the first embodiment or the information processing apparatus 2000 according to the second embodiment.

In a case where a product is thieved, there is a high possibility that a criminal is included in the captured image 12, in which the product exhibition location is imaged, during a crime is committed. Here, the information processing apparatus 2000 according to the embodiment computes the quantity of reduction in products through comparison of the captured images 12 which are respectively generated before and after a period in which the person is included in the captured image 12.

The information processing apparatus 2000 according to the third embodiment includes a detection unit 2100. The detection unit 2100 detects that the person enters an imaging range of the camera 10 using the plurality of captured images 12 generated by the camera 10, and computes a time (hereinafter, first time) at which the person enters the imaging range of the camera 10. In the same manner, the detection unit 2100 detects that the person comes out of the imaging range of the camera 10 using the plurality of captured images 12 generated by the camera 10, and computes a time (hereinafter, second time) at which the person comes out of the imaging range of the camera 10.

Furthermore, a computation unit 2040 according to the third embodiment handles the captured image 12 generated at the first time or generated before the first time, as the reference image 13. In addition, the computation unit 2040 handles the captured image 12 generated at the second time or generated after the second time, as the comparison image 14.

By determining the captured image 12 for which the quantity of reduction in products is to be computed, determination of whether to output a warning is performed only in a situation with high probability of product theft. Accordingly, there is an advantage in that it is possible to accurately detect that the product is thieved and to reduce throughput of the information processing apparatus 2000.

Note that, it is possible by a well-known object recognition technology to realize the detection of that a certain object enters the imaging range of the camera and that the object comes out of the imaging range of the camera.

Example of Hardware Configuration

A hardware configuration of the computer which realizes the information processing apparatus 2000 according to the third embodiment, is represented with reference to, for example, FIG. 3 as the same as in the first embodiment. However, in the storage device 1080 of the computer 1000, which realizes the information processing apparatus 2000 according to the embodiment, program modules, which realize functions of the information processing apparatus 2000 according to the embodiment, are further stored.

Modified Example of Third Embodiment

The detection unit 2100 may detect that the person enters the surveillance area 15 and may compute a time in which the person enters the surveillance area 15 as the first time instead of detecting that the person enters the imaging range of the camera 10. In this case, the detection unit 2100 may detect that the person comes out of the surveillance area 15 and may compute a time in which the person comes out of the surveillance area 15 as the second time instead of detecting that the person comes out of the imaging range of the camera 10.

For example, in a case where the person does not enter the surveillance area 15, such as a case where the person comes out of the imaging range immediately after entering an end of the imaging range of the camera 10, there is a low probability that the product is thieved. Here, an information processing apparatus 2000 according to a modified example computes the quantity of reduction in products before and after a period during which the person enters the surveillance area 15. In this manner, it is possible to accurately detect the theft or the like of the product and to reduce the amount of computation of the information processing apparatus 2000.

Here, in a case where the plurality of surveillance areas 15 are included in the captured image 12, the computation of the quantity of reduction in products before and after the period during which the person enters a certain surveillance area 15 may be performed for only the surveillance area 15 or may be performed for all the surveillance areas 15. In a former case, the computation unit 2040 computes the quantity of reduction in products for only the surveillance area 15-1 using the reference image 13 generated at the first time in which the person enters the certain surveillance area 15-1 and the comparison image 14 generated at the second time in which the person comes out of the surveillance area 15-1. In this manner, it is possible to reduce the number of targets, in which the quantity of reduction in products is computed, and thus it is further possible to reduce the amount of computation of the information processing apparatus 2000.

Hereinabove, although the embodiments of the present invention are described with reference to the accompanying drawings, the embodiments are examples of the present invention, and it is possible to use a combination of the above-described respective embodiments or various configurations other than the embodiments.

Although a part or whole of the embodiments is described as supplements below, the present invention is not limited thereto.

1. An information processing apparatus comprising:

a computation unit that computes the quantity of reduction in products inside a surveillance area, the surveillance area being included in both a first captured image and a second captured image, the first captured image including an exhibition location where the products are exhibited, the second captured image including the exhibition location after the first captured image is imaged; and a warning unit that outputs warning in a case where the computed quantity of reduction is equal to or larger than a reference value.

2. The information processing apparatus according to 1, wherein a plurality of the surveillance areas are provided in each of the captured images, and wherein the reference value is determined for each of the surveillance areas.

3. The information processing apparatus according to 1 or 2, further comprising:

an input reception unit that receives an input that specifies the reference value.

4. The information processing apparatus according to 3, further comprising:

a display control unit that acquires a third captured image in which the exhibition location is imaged, and superimposes a first figure on the acquired third captured image to display the superimposed first figure on a display device, the first figure representing the surveillance area, wherein the input reception unit receives an input used to draw a second figure in the first figure which is displayed on the display device, and determines the reference value corresponding to the surveillance area which is represented by the first figure based on a size of the second figure.

5. The information processing apparatus according to any one of 1 to 4, wherein the computation unit computes the amount of price of products which are reduced in the surveillance area, as the quantity of reduction in products in the surveillance area, and wherein the warning unit outputs the warning in a case where the quantity of reduction in products in the surveillance area is larger than a reference price.

6. The information processing apparatus according to any one of 1 to 5, further comprising:

a detection unit that computes a first time at which a person enters an imaging range of a camera, and a second time at which the person comes out of the imaging range of the camera, using a plurality of captured images generated by the camera which images the exhibition location, wherein the computation unit handles, as the first captured image, the captured image generated by the camera at or before the first time, and handles, as the second captured image, the captured image generated by the camera at or after the second time.

7. The information processing apparatus according to any one of 1 to 5, further comprising:

a detection unit that computes a first time at which a person enters the surveillance area, and a second time at which the person comes out of the surveillance area, using a plurality of captured images generated by a camera which images the exhibition location, wherein the computation unit handles, as the first captured image, the captured image generated by the camera at or before the first time, and handles, as the second captured image, the captured image generated by the camera at or after the second time.

8. The information processing apparatus according to any one of 1 to 7, wherein the reference value is equal to or less than 50% of the quantity of products included in the first captured image.

9. A control method executed by a computer, comprising:

a computation step of computing the quantity of reduction in products inside a surveillance area, the surveillance area being included in both a first captured image and a second captured image, the first captured image including an exhibition location where the products are exhibited, the second captured image including the exhibition location after the first captured image is imaged; and a warning step of outputting warning in a case where the computed quantity of reduction is equal to or larger than a reference value.

10. The control method according to 9, wherein a plurality of the surveillance areas are provided in each of the captured images, and wherein the reference value is determined for each of the surveillance areas.

11. The control method according to 9 or 10, further comprising:

an input reception step of receiving an input that specifies the reference value.

12. The control method according to 11, further comprising:

a display control step of acquiring a third captured image in which the exhibition location is imaged, and superimposing a first figure on the acquired third captured image to display the superimposed first figure on a display device, the first figure representing the surveillance area, wherein the input reception step includes receiving an input used to draw a second figure in the first figure which is displayed on the display device, and determining the reference value corresponding to the surveillance area which is represented by the first figure based on a size of the second figure.

13. The control method according to any one of 9 to 12, wherein the computation step includes computing the amount of price of products which are reduced in the surveillance area, as the quantity of reduction in products in the surveillance area, and wherein the warning step includes outputting the warning in a case where the quantity of reduction in products in the surveillance area is larger than a reference price.

14. The control method according to any one of 9 to 13, further comprising:

a detection step of computing a first time at which a person enters an imaging range of a camera, and a second time at which the person comes out of the imaging range of the camera, using a plurality of captured images generated by the camera which images the exhibition location, wherein the computation step includes: handling, as the first captured image, the captured image generated by the camera at or before the first time; and handling, as the second captured image, the captured image generated by the camera at or after the second time.

15. The control method according to any one of 9 to 13, further comprising:
a detection step of computing a first time at which a person enters the surveillance area, and a second time at which the person comes out of the surveillance area, using a plurality of captured images generated by a camera which images the exhibition location,
wherein the computation step includes: handling, as the first captured image, the captured image generated by the camera at or before the first time; and handling, as the second captured image, the captured image generated by the camera at or after the second time.

16. The control method according to any one of 9 to 15, wherein the reference value is equal to or less than 50% of the quantity of products included in the first captured image.

17. A program causing a computer to execute each step of the control method according to any one of 9 to 15.

The invention claimed is:
1. An information processing apparatus comprising:
at least one memory configured to store instructions; and
at least one processor configured to execute the instructions to:
compute a quantity of reduction in products inside a surveillance area, by comparing a first image, including the surveillance area, with a second image including the surveillance area, the second image being captured after the first image has been captured;
output a warning, indicating a possibility that a theft occurs, in a case where the computed quantity of reduction is equal to or larger than a reference value;
compute an amount of price of the products which are reduced in the surveillance area, based on the computed quantity of reduction;
compute a first time at which a person enters an imaging range of a camera, and a second time at which the person comes out of the imaging range of the camera, using a plurality of captured images generated by the camera which images the surveillance area; and
determine whether the computed amount of price is greater than a predetermined value of thieved products,
wherein the first image is captured by the camera at or before the first time,
wherein the second image is captured by the camera at or after the second time, and
wherein the case, where the computed quantity of reduction is equal to or larger than a reference value, comprises the computed amount of price being greater than the predetermined value of thieved products.

2. The information processing apparatus according to claim 1,
wherein a plurality of surveillance areas, including the surveillance area, are provided in each of the first image and the second image, and
wherein the reference value is determined for each of the surveillance areas.

3. The information processing apparatus according to claim 1, wherein the at least one processor further is configured to execute the instructions to:
receive an input that specifies the reference value.

4. The information processing apparatus according to claim 3, wherein the at least one processor further is configured to execute the instructions to:
acquire a third image in which the surveillance area is imaged;
superimpose a first figure on the acquired third image to display the superimposed first figure on a display device, the first figure representing the surveillance area;
receive an input used to draw a second figure in the first figure which is displayed on the display device; and
determine the reference value corresponding to the surveillance area which is represented by the first figure based on a size of the second figure.

5. The information processing apparatus according to claim 1,
wherein the at least one processor further is configured to execute the instructions to:
compute the amount of price of the products which are reduced in the surveillance area, as the quantity of reduction in the products in the surveillance area; and
output the warning in a case where the quantity of reduction in products in the surveillance area is larger than a reference price.

6. The information processing apparatus according to claim 1, wherein the at least one processor further is configured to execute the instructions to:
compute a first time at which a person enters the surveillance area, and a second time at which the person comes out of the surveillance area, using a plurality of captured images generated by a camera which images the surveillance area,
wherein the first image is captured by the camera at or before the first time; and
wherein the second image is captured by the camera at or after the second time.

7. The information processing apparatus according to claim 1,
wherein the reference value is equal to or less than 50% of the quantity of the products included in the first image.

8. The information processing apparatus according to claim 1, wherein the at least one processor further is configured to execute the instructions to:
determine a differential area by comparing the surveillance area in the first image with the surveillance area in the second image, and
wherein computing the quantity of reduction in the products is based on the differential area.

9. The information processing apparatus according to claim 1,
wherein the warning includes identification of a camera has captured the second image and a location of the surveillance area in a store.

10. A control method executed by a computer, comprising:
computing a quantity of reduction in products inside a surveillance area, by comparing a first image, including the surveillance area, with a second image including the surveillance area, the second image being captured after the first image has been captured;
outputting a warning, indicating a possibility that a theft occurs, in a case where the computed quantity of reduction is equal to or larger than a reference value;
computing an amount of price of the products which are reduced in the surveillance area, based on the computed quantity of reduction;
computing a first time at which a person enters an imaging range of a camera, and a second time at which the person comes out of the imaging range of the camera, using a plurality of captured images generated by the camera which images the surveillance area; and determining whether the computed amount of price is greater than a predetermined value of thieved products, wherein the first image is captured by the camera at or before the first time, wherein the second image is captured by the camera at or after the second time, and wherein the case, where the computed quantity of reduction is equal to or larger than a reference value, comprises the computed amount of price being greater than the predetermined value of thieved products.

11. The control method according to claim 10,
wherein a plurality of surveillance areas, including the surveillance area, are provided in each of the first image and the second image, and
wherein the reference value is determined for each of the surveillance areas.

12. The control method according to claim 10, further comprising:
receiving an input that specifies the reference value.

13. The control method according to claim 12, further comprising:
acquiring a third image in which the surveillance area is imaged;
superimposing a first figure on the acquired third image to display the superimposed first figure on a display device, the first figure representing the surveillance area;
receiving an input used to draw a second figure in the first figure which is displayed on the display device; and
determining the reference value corresponding to the surveillance area which is represented by the first figure based on a size of the second figure.

14. The control method according to claim 10, further comprising:
computing the amount of price of the products which are reduced in the surveillance area, as the quantity of reduction in products in the surveillance area; and
outputting the warning in a case where the quantity of reduction in the products in the surveillance area is larger than a reference price.

15. The control method according to claim 10, further comprising:
computing a first time at which a person enters an imaging range of a camera, and a second time at which the person comes out of the imaging range of the camera, using a plurality of captured images generated by the camera which images the surveillance area;
wherein the first image is captured by the camera at or before the first time, and
wherein the second image is captured by the camera at or after the second time.

16. The control method according to claim 10, further comprising:
computing a first time at which a person enters the surveillance area, and a second time at which the person comes out of the surveillance area, using a plurality of captured images generated by a camera which images the surveillance area;
wherein the first image is captured by the camera at or before the first time, and
wherein the second image is captured by the camera at or after the second time.

17. A non-transitory computer-readable storage medium storing a program causing a computer to execute:
computing a quantity of reduction in products inside a surveillance area, by comparing a first image including the surveillance area with a second image including the surveillance area, the second image being captured after the first image has been captured;
outputting a warning, indicating a possibility that a theft occurs, in a case where the computed quantity of reduction is equal to or larger than a reference value;
computing an amount of price of the products which are reduced in the surveillance area, based on the computed quantity of reduction;
computing a first time at which a person enters an imaging range of a camera, and a second time at which the person comes out of the imaging range of the camera, using a plurality of captured images generated by the camera which images the surveillance area; and
determining whether the computed amount of price is greater than a predetermined value of thieved products,
wherein the first image is captured by the camera at or before the first time,
wherein the second image is captured by the camera at or after the second time, and
wherein the case, where the computed quantity of reduction is equal to or larger than a reference value, comprises the computed amount of price being greater than the predetermined value of thieved products.

* * * * *